United States Patent
Manara et al.

(10) Patent No.: US 6,243,077 B1
(45) Date of Patent: Jun. 5, 2001

(54) SENSOR AND CIRCUIT ARCHITECTURE FOR THREE AXIS STRAIN GAUGE POINTING DEVICE AND FORCE TRANSDUCER

(75) Inventors: Alan Manara, Ogden; Michael C. Scofield, North Ogden; Blake Cheal, Perry, all of UT (US)

(73) Assignee: Boourns, Inc., Riverside, CA (US)

( * ) Notice: Subject to any disclaimer, the term of this patent is extended or adjusted under 35 U.S.C. 154(b) by 0 days.

(21) Appl. No.: 09/195,345

(22) Filed: Nov. 18, 1998

(51) Int. Cl.[7] ................. G09G 5/08; G01L 1/22
(52) U.S. Cl. ............... 345/157; 73/862.044; 345/161
(58) Field of Search .................. 345/156, 157, 345/158, 160, 161, 168; 73/862.044, 862.045, 862.338, 862.474, 862.627; 341/20, 22, 27, 34; 463/36, 37, 38; 200/6 A; 273/148 R; 74/471 XY; 702/101, 102, 104; 318/488

(56) References Cited

U.S. PATENT DOCUMENTS

| | | | |
|---|---|---|---|
| 3,915,015 | * 10/1975 | Crane et al. | 73/862.044 |
| 4,536,746 | * 8/1985 | Gobeli | 341/20 |
| 4,680,577 | 7/1987 | Straayer et al. | 340/711 |
| 5,252,971 | 10/1993 | Franz et al. | 341/26 |
| 5,317,520 | 5/1994 | Castle | 364/482 |
| 5,489,900 | * 2/1996 | Cali et al. | 345/156 |
| 5,541,622 | 7/1996 | Engle et al. | 345/161 |
| 5,570,111 | 10/1996 | Barrett et al. | 345/157 |
| 5,610,343 | * 3/1997 | Eger et al. | 73/862.628 |
| 5,640,178 | 6/1997 | Endo et al. | 345/161 |
| 5,648,708 | * 7/1997 | Littlejohn | 318/488 |
| 5,675,309 | 10/1997 | DeVolpi | 338/68 |
| 5,696,535 | 12/1997 | Rutledge et al. | 345/156 |
| 5,773,728 | * 6/1998 | Tsukada et al. | 73/862.627 |
| 5,835,977 | * 11/1998 | Kamentser et al. | 73/862.044 |
| 5,870,078 | 2/1999 | Olyha, Jr. et al. | 345/157 |
| 5,872,320 | 2/1999 | Kamentser et al. | 73/862.044 |
| 5,874,938 | * 2/1999 | Marten | 345/156 |
| 5,966,117 | * 10/1999 | Seffernick et al. | 345/161 |
| 6,040,821 | * 3/2000 | Franz et al. | 345/157 |

FOREIGN PATENT DOCUMENTS 0663648  7/1995  (EP) ................ G06K/11/18

* cited by examiner

*Primary Examiner*—Steven Saras
*Assistant Examiner*—Paul A. Bell
(74) *Attorney, Agent, or Firm*—Klein & Szekeres, LLP

(57) ABSTRACT

A pointing device for use with computers and other electronic systems incorporates an array of resistive strain gauges on the surface of a substrate. The strain gauges exhibit resistance changes in response to stress or strain applied to the substrate by the movement of a joystick attached to the substrate, the resistance changes being proportional to the extent of movement of the joystick The strain gauges are electrically connected to control circuitry that successively establishes a series of voltage dividers across different ones of the strain gauges to measure the resistance of each of the strain gauges. From those measurements the position of the pointing device may be determined by comparing the measured resistances with known resistance values that correspond to a neutral stick position. The control circuitry establishes the voltage dividers by applying a known voltage across successive pairs of the strain gauges, and then detecting the voltage at the midpoint between the strain gauges that form each strain gauge pair to which the voltage is applied.

16 Claims, 4 Drawing Sheets

SENSOR AND CIRCUIT ARCHITECTURE FOR THREE AXIS STRAIN GAUGE POINTING DEVICE AND FORCE TRANSDUCER

CROSS-REFERENCE TO RELATED APPLICATIONS

Not Applcable

FEDERALLY SPONSORED RESEARCH OR DEVELOPMENT

Not Applicable

BACKGROUND OF THE INVENTION

The present invention relates generally to pointing devices for use in connection with computers and other electronic instruments and devices. More specifically, the present invention relates to a pointing device used to move a pointer or cursor on a display of a computer or similar electrical or electronic device or instrument.

Many operations relating to the use of modern computers, and in particular personal computers, require that a pointer or cursor be placed in a particular location on a display screen. In addition, many computer-operated and video games are operated based on positioning the cursor or pointing device in a particular location.

In some applications, the position of the cursor may be governed by a touch pad, which is a small touch-sensitive pad embedded in the casing of the device or instrument. Pressure applied to different portions of the pad controls the movement of the cursor on the screen.

In other applications, a joystick is used to control the movement of the cursor. On some laptop computers, this joystick may be a very small device positioned between several of the keys on the keyboard. The computer user manipulates such a small joystick by the end of the user's finger. On many computer games, and in other applications, the joystick may be somewhat larger, and be manipulated by the user grasping the entire joystick with the user's hand. Other applications may use joysticks of different sizes to manipulate a position indicator on the screen. The present invention will be described in connection with its application to joysticks.

The position of the joystick, and its movement relative to its central "rest" or "neutral" position, should be identified so that such position information can be transferred to place the cursor at the appropriate spot on the computer screen or display. A variety of devices have been designed for detecting the position of a joystick. One particular mechanism for a pointing device is described in U.S. Pat. No. 5,640,178 to Endo et al. This reference describes a joystick mounted on a resilient substrate. Strain gauges are formed on one surface of the substrate. A voltage is applied across a pair of the strain gauges in a particular direction, and the voltage at a half bridge output terminal between the strain gauges is measured. From this voltage, the amount of strain on each of the strain gauges of the pair may be determined. From that information, position information can be interpreted. However, this measurement technique requires that the strain gauges of the pair be exactly matched, with exactly equivalent properties. In one embodiment, the strain gauges are formed in a particular configuration so they can be laser trimmed to ensure that the strain gauges have identical properties.

SUMMARY ON THE INVENTION

The present invention is a pointing device that measures strain on a substrate, and a method of operating such a pointing device. The strain gauges are configured as a series of voltage dividers across the substrate surface in a pattern that will allow the changes in the resistances of the strain gauges to be measured. From that determination, the position and displacement of the pointing device can be defined.

In accordance with the present invention, a plurality of perimeter contact points is formed on the substrate surface, as is a plurality of strain gauges. Each strain gauge electrically connects a central contact point with one of the perimeter contact points. A controller circuit connected to a voltage source successively connects the voltage source across selected pairs of the perimeter contact points, and then detects the voltage at the central contact point between the strain gauges that are connected between the perimeter contact points across which the voltage source is connected. Different patterns of high and low voltages are connected to the perimeter contact points to establish the voltages across the different pairs of strain gauges.

In one particular embodiment, the strain gauges of the pointing device are formed of strain-sensitive ink applied to the substrate surface. In another embodiment, a resistor having a known resistance is connected to the central contact point and the voltage is applied across that known resistance as well as the strain gauge resistances to determine a force applied along an additional axis. In still another embodiment, a resistor having a known resistance is connected in series with one of the pairs of strain gauges to measure the amount of strain when the strain gauges are stressed in the same direction. The voltage drop across each of the strain gauge resistors is measured to determine the force on each of the three axes.

DETAILED DESCRIPTION OF THE INVENTION

Figure 1:
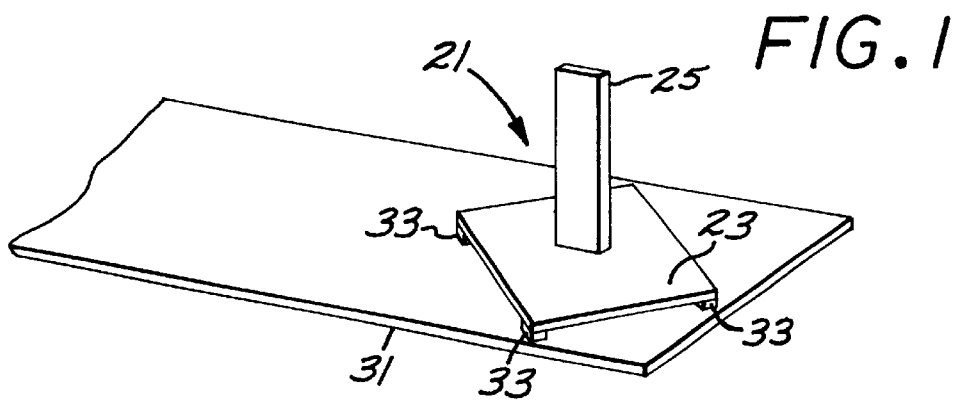
FIG. 1 is a perspective view of a pointing device incorporating the present invention.
Figure 2:
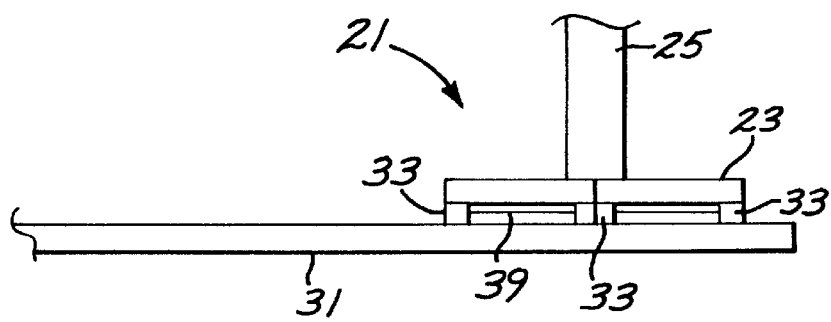
FIG. 2 is a side elevational view of the pointing device illustrated in FIG. 1.

Referring first to FIGS. 1 and 2, a pointing device 21 incorporating a preferred embodiment of the present invention is illustrated. The pointing device 21 includes a base 31 that may comprise a printed circuit board incorporating various circuit elements, as described below. A planar substrate 23 is suspended above the base 31. The substrate 23 is preferably formed of alumina, but it may also be formed of ceramic. The substrate 23 is preferably square, a shape that maximizes strength. Furthermore, the square shape optimizes space utilization by the strain gauge sensor arrays (as described below), thereby maximizing yields from existing alumina and ceramic plates that would be used for the substrate 23.

A plurality of conductive solder contact pads 33 permit electrical contact between circuitry formed on the underside of the substrate 23 and circuitry formed on the base 31. A post or stick 25 projects from the upper side of the substrate 23. The stick 25 (which may be in the form of a joystick) forms the portion of the device 21 that may be manipulated (either directly or indirectly) by the user, and its movement from a predefined neutral position applies stress and/or strain to the substrate 23.

Figure 3A:
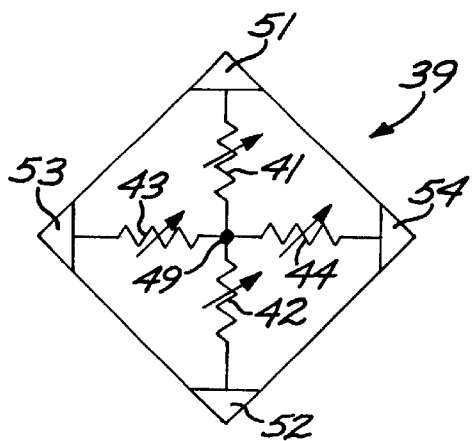
FIG. 3A is a schematic diagram of the electrical circuit formed by a preferred arrangement of the strain gauge bridge structure of the present invention.
Figure 3B:
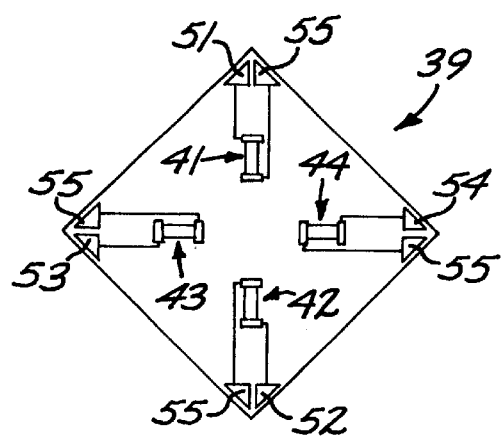
FIG. 3B is a representation of a preferred physical arrangement of the strain gauge bridge structure of the present invention.
Figure 4:
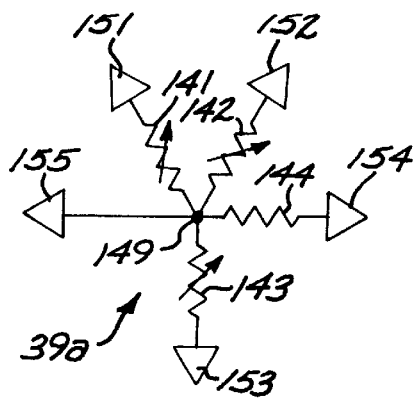
FIG. 4 is a schematic representation of an electrical circuit formed by a second arrangement of the strain gauge bridge structure of the present invention.
Figure 5:
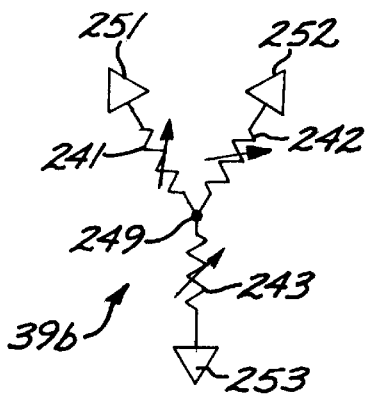
FIG. 5 is a schematic representation of an electrical circuit formed by a third arrangement of the strain gauge bridge structure of the present invention.

Referring next to FIGS. 3A and 3B, an array 39 of strain gauges 41, 42, 43, 44 is arranged on the lower surface of the substrate 23. Preferably, the array 39 of strain gauges is applied to the surface of the substrate 23 that is opposite the surface from which the stick 25 projects. FIGS. 4 and 5 respectively show a second strain gauge array 39a and a third strain gauge array 39b, both of which will be described in more detail below. Each array 39, 39a, 39b of strain gauges comprises a pattern of individual strain gauges. The pattern of strain gauges in the array is preferably symmetrical. For example, in the array 39 of FIGS. 3A and 3B, the strain gauges 41–44 are arranged in a cruciform array, in pairs along each of the diagonals of the square substrate 23, and they are all substantially equidistant from the geometric center of the substrate 23.

Each strain gauge constitutes a variable resistor, the resistance of which changes as a function of strain applied to the portion of the substrate 23 on which the strain gauge is located. For example, a tensile strain may cause the resistance of a strain gauge to increase, while a compressive strain may cause the resistance of the strain gauge to decrease. The strain gauges are advantageously formed of strain-sensitive ink applied to the surface of the substrate. Suitable inks are well-known in the art. The other elements of the strain gauge array may be formed by applying conductive ink to the surface of the substrate.

Referring, for example, to the embodiment illustrated in FIGS. 3A and 3B, four strain gauges 41, 42, 43, and 44 are provided in a cross-shaped array 39. FIG. 3A illustrates the strain gauges 41, 42, 43, 44 schematically as variable resistors. Each strain gauge 41, 42, 43, 44 connects a central contact point 49 with a respective one of several perimeter contact pads 51, 52, 53, 54. The central contact point 49 may be formed as a contact on the surface of the substrate 23, or it may be formed on a circuit board (not shown) on the base 31. In the latter case, each of the strain gauges 41–44 would be electrically connected to the central contact point 49 by a discrete conductor, such as a contact pad or a wire (not shown). In the physical arrangement shown in FIG. 3B, for example, the central contact point 49 (FIG. 3A) is not on the substrate 23, but rather it is on the base 31. Each of the strain gauges is connected between its respective perimeter contact point and one of a plurality of secondary contact pads 55, each of which is electrically connected to the central contact point 49 on the base 31. The perimeter contact pads 51, 52, 53, 54 and the secondary contact pads 55 are advantageously formed of a conductive ink, as are the connections between each of the contact pads and its respective strain gauge, and the connections among the strain gauges. The solder contact pads 33 (FIG. 1) may contact the perimeter contact pads 51, 52, 53, 54 and the secondary contact pads 55 of the substrate to provide electrical connection between the strain gauge array and the circuitry formed on the base board 31.

First and second strain gauges 41, 42 along a first axis of the cross-shaped array 39 may be used to measure the strain caused in the substrate 23 by a movement of the stick 25 in the first axis (which for the purposes the following discussion may be described as the Y axis). Third and fourth strain gauges 43, 44 on the other (orthogonal) axis of the cross-shaped array 39 may be used to measure the strain caused in the substrate 23 by movement of the stick 25 in the orthogonal axis 13 (which for the purposes of the following discussion may be described as the X axis). When the stick 25 is pushed in the Y axis toward the second strain gauge 42, a tensile strain is applied to the second strain gauge 42, while a compressive strain may be applied to the first gauge 41. The compressive strain in the first strain gauge 41 will cause the resistance of the strain gauge 41 to change in one direction. For example, the resistance in the strain gauge under compression may decrease. In contrast, the resistance of these second strain gauge 42 that is under tensile strain will change in the other direction. For example, the resistance of the second strain gauge under tensile strain may increase. A similar phenomenon is experienced by the strain gauges 43, 44 when the stick 25 is moved along the X axis. The change in strain gauge resistance will be substantially proportional to the distance that the stick 25 is moved from its neutral position. Thus, the magnitude of the stick's movement (i.e., its distance from the neutral position) along either axis is determined by the magnitude of its resistance change from a nominal value established for its neutral position, while the direction of movement is determined by which of the strain gauges along a particular axis increases in resistance and which decreases in resistance.

If desired, the device can be configured to measure movement along a third (Z) axis orthogonal to the X axis and the Y axis (i.e., perpendicular to the plane of the substrate). When a force is applied to the top of the stick 25 (that is, a force applied anally to the stick 25), strain is applied to the resistors 41, 42, 43, 44, causing the resistance in all of the strain gauges to change in the same direction. In this manner, movement along the Z axis can be measured. Of course, the stick 25 may be moved in a direction that has components along more than one of the X, Y, and Z axes, and the affected strain gauges will react in the appropriate manner.

Figure 6:
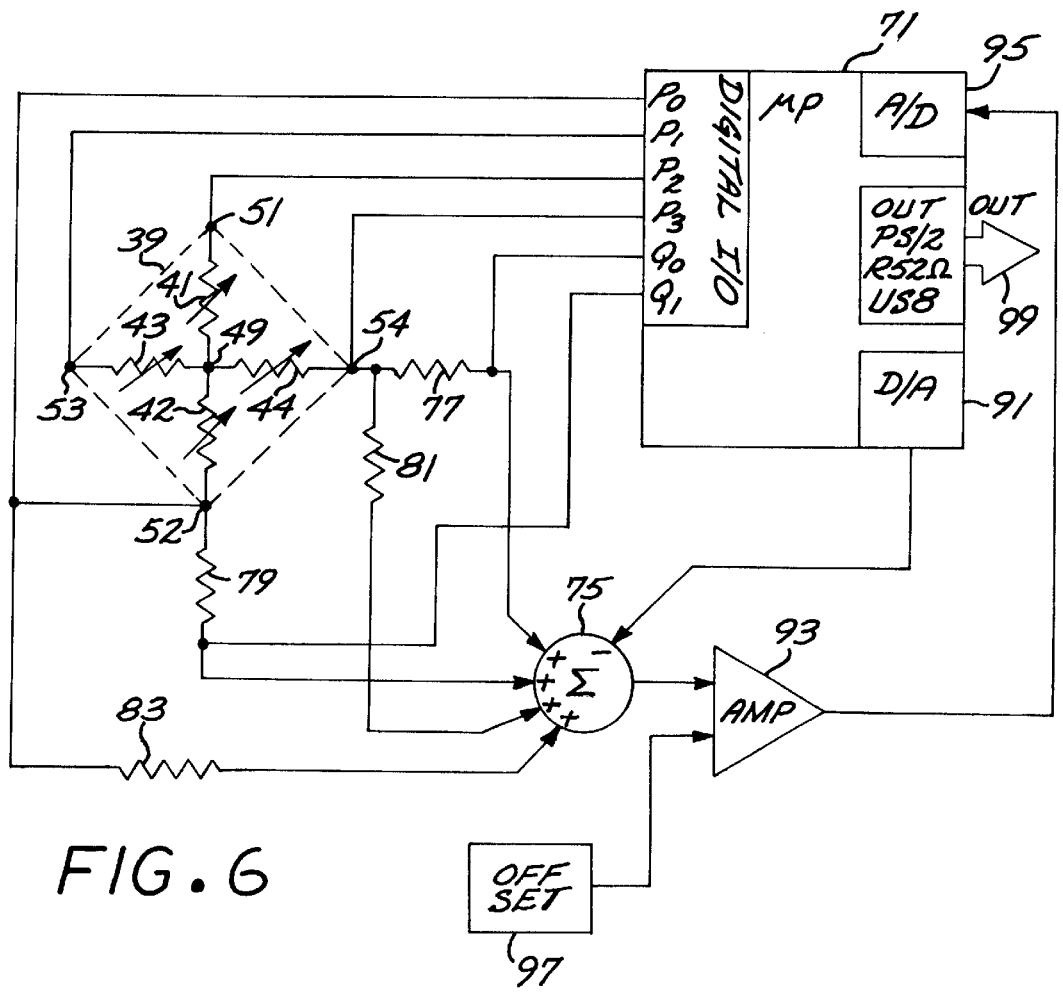
FIG. 6 is a schematic representation of a first circuit architecture of the present invention.

Referring next to FIG. 6, the strain gauge array of FIGS. 3A and 3B is connected to control circuitry for selectively applying voltages to each of the perimeter contact pads 51, 52, 53, 54 of the strain gauge array 39, and for measuring outputs at others of the perimeter contact pads. Appropriate control of the application of voltages to the strain gauge array allows the control circuitry to determine the resistance value of each of the strain gauges 41, 42, 43, 44. By comparing the measured value of each of the strain gauge resistances with a previously stored value determined when the strain gauge array is not under stress, the direction and magnitude of the movement of the stick 25 can be determined. Circuitry in the base 31 may include control circuitry such as the control circuitry shown in FIG. 6. Alternatively, circuitry in the base circuit board 31 may connect the strain gauge array with control circuitry at another location.

The control circuitry successively applies a voltage across different pairs of the strain gauges, and measures the voltage at the central point 49, to create a series of voltage dividers. From creating and measuring the output from a series of such voltage dividers, the values of, or changes in, the resistance value of each of the strain gauges 41, 42, 43, 44 can be determined.

Figure 7A:
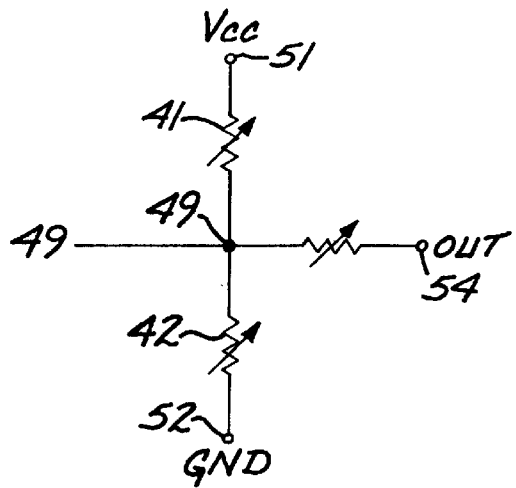
FIGS. 7A–7D are schematic representations of operational configurations of the circuit architecture of FIG. 6.

Referring now to FIGS. 7A to 7D, voltage divider circuits are shown from which the changes in the resistances of the strain gauges 41, 42, 43, 44 may be determined. Each of the circuits shown in FIGS. 7A–7D may be used with the control circuitry of FIG. 6. Referring first to FIG. 7A, a voltage or potential is applied across the pair of Y axis strain gauges 41, 42. To accomplish this, a high state ($V_{CC}$) may be connected to the first perimeter contact point 51 (FIGS. 3A, 3B), which is adjacent the first strain gauge 41, while a low state (ground) is connected to the second contact point 52 (FIGS. 3A, 3B) adjacent the second strain gauge 42. The voltage at the central contact point 49 may be measured by detecting the voltage at one of the X axis perimeter contact points 53, 54 that are adjacent the orthogonal strain gauges 43, 44. In the schematic illustrated in FIG. 7A, the voltage is detected at the perimeter contact pad 54 adjacent the strain gauge 44. This configuration produces a voltage divider across the Y axis strain gauges 41, 42. Subsequently, the voltage across the strain gauges 41, 42 may be reversed, with the high state $V_{CC}$ applied to the second perimeter contact point 52, and the low state (ground) applied to the first perimeter contact point 51. Measurement or detection of the midpoint voltage may again be taken off the fourth contact point 54. This configuration is shown schematically in FIG. 7B. Taking the voltages measured at the central contact point 49 in the two voltage divider arrangements allows the relative values of the variable strain gauges 41, 42 to be determined. By taking two voltage measurements at the fourth perimeter contact point 54, one for each polarity of the voltage applied across the Y-axis strain gauges 41, 42, the effect of the X-axis strain gauge 44 (through which the voltage at the central contact point 49 is measured) is essentially negated.

Similarly, the X axis strain gauges 43, 44 may be analyzed by applying a voltage across the X axis strain gauge pair 43, 44, and measuring the voltage at the central point 49 between them. Referring to FIG. 7C, a high state ($V_{CC}$) may be applied to the third perimeter contact point 53 adjacent the strain gauge 43, and a low state (ground) may be applied to the fourth perimeter contact point 54. The voltage is detected at one of the other perimeter contact points, such as the first perimeter contact point 51. The voltage may then the reversed across the strain gauges 43, 44, as shown in FIG. 7D. Using the voltage detected at the midpoint or central contact point 49 when a voltage is applied across the X axis strain gauges 43, 44, the relative values of the strain gauges 43, 44 may be determined. Again, the use of two voltage measurements at the first perimeter contact 51 substantially negates the effect of variations in the resistance of the Y-axis strain gauge 41 through which the voltage measurement is taken.

In accordance with an aspect of the present invention, the control circuitry may perform this analysis on the strain gauges 41, 42, 43, 44 when the pointing device is first powered on, such as when the computer is initially turned on. If, at power-on, no pressure is being applied to the stick 25 of the pointer 21, the nominal, or "at rest," values of the strain gauges 41, 42, 43, 44 may be determined. These nominal values may be stored for later comparison with values measured when the strain gauges 41, 42, 43, 44 are under stress due to manipulation of the stick 25.

Because the nominal value of each strain gauge is determined, and can be used as a comparison point in later measurements, it is not necessary that each strain gauge be exactly identical. Differences among the characteristics of the strain gauges may be compensated for in the calculations made during subsequent measurements. Therefore, manufacturing procedures may be simplified, and it may not be necessary to precisely trim each strain gauge so that they all have exactly the same resistance value and performance characteristics.

Referring again to FIG. 6, the control circuitry may include a general purpose microprocessor 71 having a plurality of digital input/output ports P0, P1, P2, P3, Q0, and Q1. Each of the digital input/output ports P0–P3 of the microprocessor 71 is connected to a corresponding one of the perimeter contact points 51, 52, 53, 54. The input/output port Q0 is connected to the fourth perimeter contact point 54 through a first fixed resistor 77, and the digital input/output port Q1 is connected to the second perimeter contact point 52 through a second fixed resistor 79. The fixed resistors preferably have resistance values about 1.5 times the nominal (unstressed) resistance value of each of the strain gauge resistors 41–44.

A summer 75 combines the states of some of the perimeter contact points and some of the digital input/output ports of the microprocessor 71 to produce a signal that can be interpreted to determine the strain applied to the strain gauge elements 41–44. In the illustrated example, the states of the digital input/output ports P0, P3, Q0, and Q1 of the microprocessor 71 are combined with the states of the perimeter contact points 52, 54.

Some of the digital input/output ports of the microprocessor 71 are connected directly to the summer 75, while others are connected through fixed resistors. Specifically, the digital input/output port Q0 is connected directly to a first input of the summer 75. The fourth perimeter contact point 54 is also connected to the first input of the summer 75 through the first fixed resistor 77. The digital port Q1 is directly connected to a second input of the summer 75. The second perimeter contact point 52 is also connected to the second summer input through the second fixed resistor 79. The input/output port P3 and the fourth perimeter contact point 54 are connected to a third input of the summer 75 through a third fixed resistor 81. Finally, the input/output port P0 and the second perimeter contact point 52 are connected to a fourth summer input through a fourth fixed resistor 83. In one particular exemplary embodiment, each of the third and fourth fixed resistors 81, 83 has a resistance of approximately 2.5 times the nominal (unstressed) resistance of the strain gauge resistors 41–44.

A digital to analog (D/A) converter 91, which may be a portion of the microprocessor 71, provides a negative the input to the summer 75.

The output of the summer 75 is applied to an amplifier 93. The amplifier output is applied to an analog to digital (A/D) converter 95, which may be part of the microprocessor 71. An offset 97 may be a also applied to the amplifier 93 to compensate for any DC bias arising from mismatch among the individual components of the system.

The circuit illustrated in FIG. 6 may additionally provide measurement of a force applied to the stick 25 of the position control 21 in the Z axis (perpendicular to the plane of the substrate 23, as seen in FIG. 2). A Z axis force applied to the substrate 23 creates the same strain in the X axis strain gauges 43, 44 and in the Y axis strain gauges 41, 42, and the strain is in the same direction for all the strain gauges 41, 42, 43, 44. The Z axis force can be measured by placing a resistor in series with either the X axis strain gauges 43, 44, or the Y axis strain gauges 41, 42, and applying a voltage to both axes. One of the resistors 77, 79, 81, 83 may be used for this purpose. By measuring the voltage drop across the resistor placed in series with the one axis, the strain applied in the Z direction to the strain gauge resistors 41, 42, 43, 44 can be determined. For example, the resistor 77 may placed in series with the X aids strain gauges 43, 44. The voltage drop across the resistor 77 can be measured through the electrical path connecting the perimeter contact point 54 with the summer 75 (through the resistor 81).

Figure 7B:
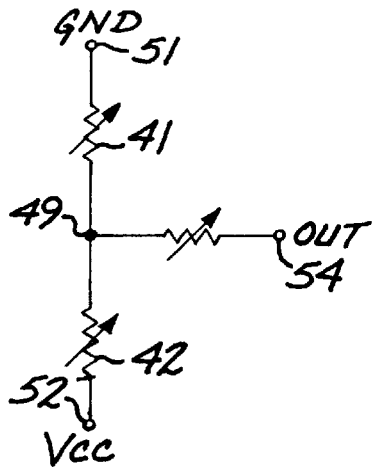
Figure 7C:
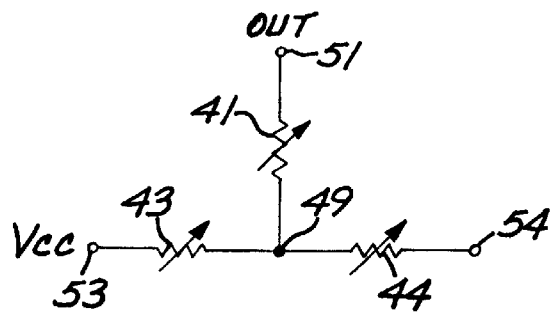
Figure 7D:
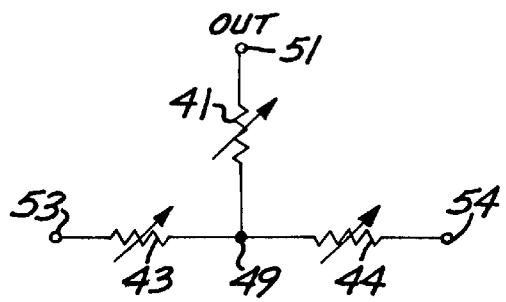

To measure the strain in each axis (X, Y, Z), the digital input/output ports P0–P3, Q0, and Q1 of the microprocessor 71 are set to successively establish the voltage divider configurations shown in FIGS. 7A–7D. To set those voltage dividers, the digital input/output ports P0–P3, Q0, and Q1 of the microprocessor 71 are set to the following states:

| STATE | Illustrated Arrangement | P0 | P1 | P2 | P3 | Q0 | Q1 |
|---|---|---|---|---|---|---|---|
| Measure Y (1) | Figure 7A | 0 | R | 1 | R | R | 0 |
| Measure Y (2) | Figure 7B | 1 | R | 0 | R | R | 1 |
| Measure X (1) | Figure 7C | R | 1 | R | 0 | 0 | R |
| Measure X (2) | Figure 7D | R | 0 | R | 1 | 1 | R |
| Measure Z | | R | 1 | 1 | R | 0 | 0 |

In which: 1 is relatively high voltage ($V_{CC}$); 0 is relatively low voltage (ground); and R is high impedance.

The microprocessor 71 may be programmed to selectively set the microprocessor input/output ports P0–P3, Q0, and Q1 in the appropriate states.

The microprocessor 71 has an output port 99, which may be any of several conventional microprocessor output ports. For example, the port 99 may be a PS/2 port, an RS232 port, or a Universal Serial Bus. Other types of output ports will become apparent to those skilled in the art.

By successively setting up each of the two voltage divider circuits shown in FIGS. 7A and 7B, a succession of signals indicative of the voltage at the central contact point 49 is applied through the summer 75 to the microprocessor 71. The microprocessor 71 compares the voltage value received with a voltage value stored in the non-volatile memory of the microprocessor 71 that is read on power-up, or at another time when no strain is placed on the pointing device. From this comparison, the microprocessor 71 calculates the changes in the resistances of the Y axis strain gauges 41, 42. From these changes, the microprocessor 71 can, using conventionally known procedures, determine the stresses being applied to the stick 25 of the cursor control 21 in the Y axis. From these stresses, the microprocessor 71 can then further determine the appropriate position along the Y axis for the cursor or other pointing device.

Similarly, by successively setting up each of the two voltage divider circuits shown in FIGS. 7C and 7D, a succession of signals indicative of the voltage at the central contact point 49 is applied through the summer 75 to the microprocessor 71. The microprocessor 71 compares the voltage value received with a voltage value stored in the non-volatile memory of the microprocessor 71 that is read on power-up, or at another time when no strain is placed on the pointing device. From this comparison, the microprocessor 71 calculates changes in the resistances of the X axis strain gauges 43, 44. From these changes, the microprocessor 71 can determine, using conventionally known procedures, the stresses being applied to the stick 25 of the cursor control 21 in the X axis. From these stresses, the microprocessor 71 can then further determine the appropriate position along the X axis for the cursor or other pointing device.

Figure 8:
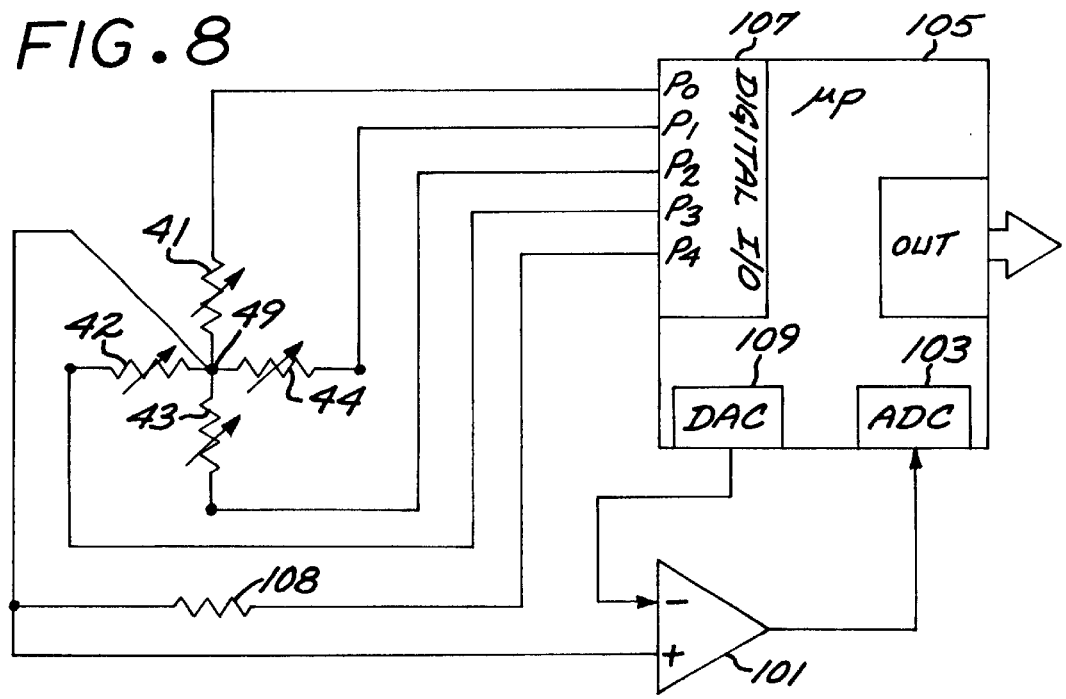
FIG. 8 is a schematic representation of a second circuit architecture of the present invention.

An alternative circuit for measuring a Z axis force applied to the pointing device is shown in FIG. 8. In the illustrated embodiment, contact is provided directly to the central contact point 49 of the strain gauge array. This direct contact allows direct measurement of the voltage division across the strain gauges 41–44. The central contact point 49 is connected to the input of an amplifier 101. The output of the amplifier 101 is applied to an analog to digital converter 103 for use by a microprocessor 105. The analog to digital converter 103 may form a portion of the microprocessor 105. The microprocessor 105 has a plurality of digital input/output ports 107, individually labeled P0–P4. These digital input/output ports 107 are successively set to high and low voltages, and to high impedance to set up the series of voltage dividers.

| STATE | P0 | P1 | P2 | P3 | P4 |
|---|---|---|---|---|---|
| Measure Y (1) | 0 | R | 1 | R | R |
| Measure Y (2) | 1 | R | 0 | R | R |
| Measure X (1) | R | 1 | R | 0 | R |
| Measure X (2) | R | 0 | R | 1 | R |
| Measure Z | R | 1 | 1 | R | 0 |

An external known (and generally fixed) resistor 108 is connected directly between the central contact point 49 and one of the digital input/output ports 107 (i.e., P4) of the microprocessor 105. This additional resistor 108 provides an additional bridge in the strain gauge array that may be measured. By setting the states of the digital input/output ports 107 of the microprocessor 105 to establish a series of voltage dividers across the strain gauges 41–44 in a manner similar to that described above in connection with the arrangement illustrated in FIG. 6, the force components in the X and Y axes may be determined. A fifth voltage divider can be set up across the additional fixed resistor 108 by appropriately controlling the digital input/output port P4 of the microprocessor 105. Because a Z axis force causes the resistances of the first four strain gauges 41–44 all to change in the same direction, the voltage divider across the one of the Y-axis strain gauges (e.g., the strain gauge 42), one of the X-axis strain gauges (e.g., the strain gauge 44), and the eternal fixed resistor 108 allows the Z axis force to be determined. The high voltage ($V_{CC}$) may be applied to the strain gauges 42 and 44 simultaneously. The external resistor 108 may be connected between the central contact point and a very low potential (such as ground). By measuring the voltage at the central contact point, between the strain gauges 42 and 44 and the external resistor 108, a voltage divider is established. Because the external resistor 108 is fixed, the change in the resistance of the strain gauges 42 and 44 may be measured, and the strain in the Z aids calculated. As with the embodiment described above in connection with FIG. 6, the digital input/output ports 107 are used to switch among a high voltage ($V_{CC}$), ground, and high impedance states around the array of strain gauges 41–44.

The microprocessor 105 may generate an offset signal to compensate for differences among the values of the individual resistors 41–44 of the strain gauge array. This offset signal is converted to an analog signal in a digital to analog converter 109, which may also be a portion of the microprocessor 105. The analog offset signal is applied to the amplifier 101.

Referring now to FIGS. 4 and 5, two alternative strain gauge arrays, 39a and 39b, respectively, are shown. Each of the triangular strain gauge arrays illustrated in FIGS. 4 and 5 includes three strain gauges, and it may be applied to a triangular substrate that substantially conforms to the strain gauge array.

FIG. 4, for example, illustrates a triangular arrangement of strain gauge variable resistors 141, 142, 143, each connecting a central contact point 149 with one of three perimeter contact points 151, 152, 153. A fixed resistor 144 connects the central contact point 149 with a fourth perimeter contact 154.

A known voltage $V_{CC}$ may be connected to the fourth perimeter contact 154, and a series of voltage dividers may be created that divide a known voltage across the fixed resistor 144 and, in succession, the variable resistances of the strain gauges 141, 142, 143. The midpoint voltage at the central contact point 149 is detected on a fifth perimeter contact 155. From such a series of voltage dividers, the resistances of the strain gauges 141, 142, 143 may be measured, and the strain applied to each of the strain gauges determined. From this information, the appropriate position for the cursor control may be determined.

In particular, a known voltage $V_{CC}$ may be applied to the fourth contact point 154 that is connected to the fixed resistor 144. The second and third perimeter contacts 152, 153 may be connected to high impedances, and the first perimeter contact 151 may be connected to a high potential through a low impedance. In this fashion, the voltage divider is set up across the fixed resistor 144, and the first strain gauge variable resistance 141. The output voltage at the central contact point 149 forming the midpoint of the voltage divider is measured at the fifth perimeter contact 155. From the known resistance of the fixed resistor 144, the value of the variable resistor 141 may be determined. Similar voltage dividers may successively be set up for the second and third strain gauges 142, 143.

Figure 9:
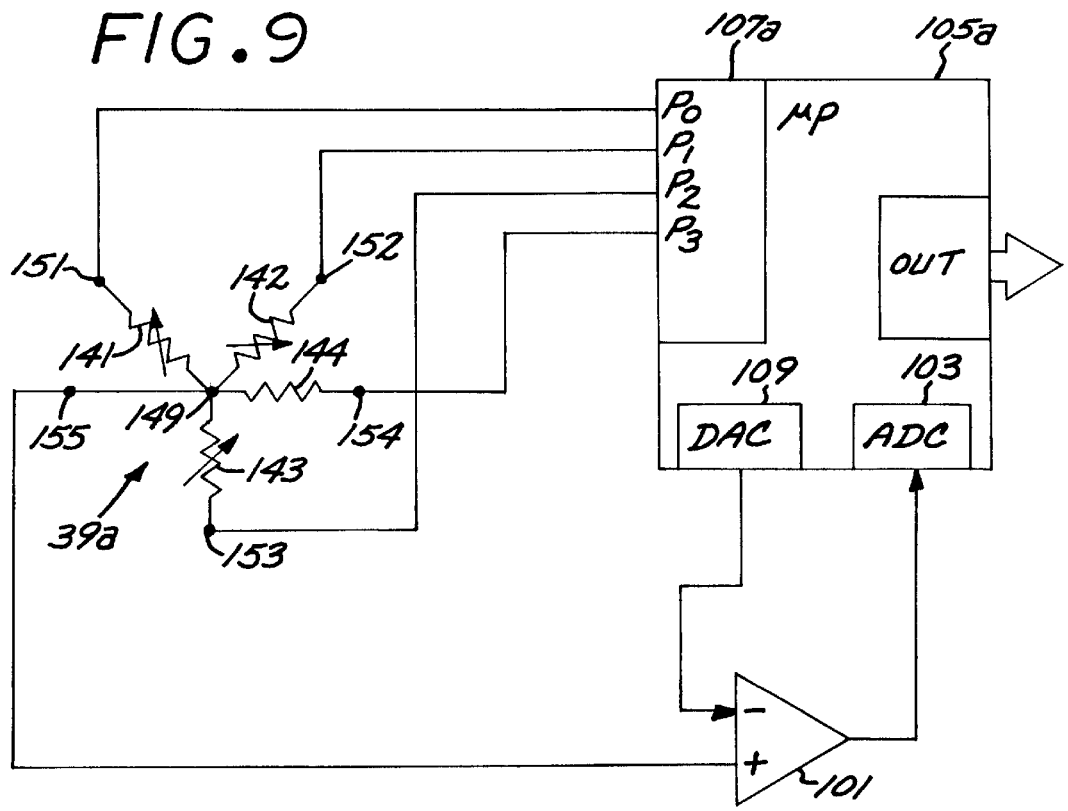
FIG. 9 is a schematic representation of a third circuit architecture of the present invention.

As shown in FIG. 9, the strain gauge array 39a of FIG. 4 is connected to control circuitry for establishing the voltage dividers described above. In this control circuit, the known voltage $V_{CC}$ is supplied to the fourth perimeter contact point 154 of the strain gauge array 39a through a digital input/output port P3 of a microprocessor 105a. The perimeter contact points 151, 152, 153 of the strain gauge array are connected to the digital input/output ports P0, P1, P2, respectively, of the microprocessor 105a. The digital input/output ports P0, P1, P2 are selectively set to establish the voltage dividers across the three strain gauges 141, 142, 143.

The fifth perimeter contact point 155 is connected to the input of a summing amplifier 101. An offset may be applied to the amplifier 101 from the microprocessor 105a through a digital to analog converter 109. The output of the amplifier 101 is applied to the microprocessor 105a through an analog to digital converter 103.

Using trigonometric calculations, the strain measured in each of the triangular legs of the array illustrated in FIG. 4 can be converted to X and Y axis values, or other appropriate coordinates. Preferably, the triangular arrangement of the strain gauges is symmetrical, with a 120 degree angle between each of the strain gauge legs.

Yet a third strain gauge array 39b is illustrated in FIG. 5, which illustrates a triangular array of three strain gauges 241, 242, 243. Each of the strain gauges 214, 242, 243 connects a central contact point 249 with one of three perimeter contact points 251, 252, 253. Using tri-state ports on a microprocessor (not shown), a series of voltage dividers may be established across successive pairs of the strain gauges 241, 242, 243. It will be recognized that control circuitry similar to that shown in FIG. 9 may be configured to set up such a series of voltage dividers. Using the known angles for the each leg of the strain gauge array 39b, the stresses measured on each leg of the array can be converted to an appropriate coordinate system.

The systems and methods described above may consume less power than many existing systems and methods for pointing devices. Using the systems and methods described above, the pointing device and its controller circuitry need not be powered at all times, but need only be powered at times that measurements are being taken. In addition, the power is switched around the various contact points on the substrate, to successively power the different strain gauges, so that not all contact points need to be continuously powered.

An additional advantage of the apparatus and methods described above is that automatic gain adjustment can be achieved by simply correcting the amplifier offset through the analog output feedback from the microprocessor 71 to the amplifier 93 (in the FIG. 6 embodiment).

A further advantage of the systems and methods described above is that the square, triangular, or other regular shape of the strain gauge array permits the substrate 23 to be manufactured in a similarly regular shape. Such regular shaped substrates are easier to manufacture than the intricate shapes often required with other pointing devices.

Finally, using appropriate electronic techniques (including calculations by the microprocessor), differences in the specific characteristics of the strain gauges may be accounted for. Therefore, the strain gauges need not exactly match one another, and expensive laser trimming of the strain gauges to match them is not necessary.

Those skilled in the art will recognize that modifications may be made to the particular embodiments described above without departing from the invention. For example, other arrangements of the strain gauges on the substrate may be made, and different substrate materials may be used. In addition, other types of control circuitry may be used. Moreover, the device 21 can be configured for use as a force transducer, with the control circuit employing a microprocessor that is programmed to yield a force-indicative output signal in response to the sensed displacement of the stick 25. Therefore, the particular embodiments described above are considered exemplary, and should not be considered limiting. Rather, the scope of the invention is defined in the claims that follow.

We claim:

1. A pointing device, comprising:

a substrate;

a plurality of perimeter contact points on the substrate;

a central contact point on the substrate;

a plurality of strain gauges on the substrate, each connected between one of the perimeter contact points and the central contact point, whereby the strain gauges form at least two strain gauge voltage dividers; and a control circuit, connected to the perimeter contact points, and operable to apply a voltage successively across the at least two strain gauge voltage dividers and, for each applied voltage, to detect a measured voltage at the central contact point.

2. The pointing device of claim 1, wherein the voltage applied constitutes a drop from a high potential to a low potential, and wherein the control circuit first connects the high potential to a first perimeter contact point and the low potential to a second perimeter contact point, and then connects the high potential to the second perimeter contact point and the low potential to the first perimeter contact point.

3. The pointing device of claim 1, wherein the control circuit subsequently connects the high potential to a third perimeter contact point and the low potential to a fourth perimeter contact point, and then connects the high potential to the fourth perimeter contact point and the low potential to the third perimeter contact point.

4. The pointing device of claim 1, wherein the control circuit first applies the voltage across first and second perimeter contact points in a first polarity, then applies the voltage across the second and first perimeter contact points in the opposite polarity, then applies the voltage across a third perimeter contact point and a fourth perimeter contact point in a first polarity, and then applies the voltage across the fourth and third perimeter contact pints in the opposite polarity.

5. The pointing device of claim 1, further comprising a resistor having a known resistance, wherein the control circuit selectively connects the resistor in series with one of the strain gauges; and wherein the control circuit selectively applies the voltage to one end of a first pair of the strain gauges and to one end of a second pair of the strain gauges plus the resistor, and measures the voltage difference between the other end of the first and second pairs of strain gauges.

6. The pointing device of claim 1, wherein:

the plurality of strain gauges comprises a first Y axis strain gauge connecting the central contact point with a first perimeter contact point;

a second Y axis strain gauge connecting the central contact point with a second perimeter contact point;

a first X axis strain gauge connecting the central contact point with a third perimeter contact point; and a second X axis strain gauge connecting the central contact point with a fourth perimeter contact point.

7. A method of determining the position of a pointing device, comprising the steps of:

providing a plurality of perimeter contact points on a substrate;

providing a central contact point on the substrate;

providing a plurality of strain gauges on the substrate, wherein each of the strain gauges connects the central contact point with one of the perimeter contact points;

with the pointing device in a known position:
dividing a predetermined voltage across a first pair of the strain gauges; and
dividing the predetermined voltage across a second pair of the strain gauges; and with the pointing device in an unknown position:
dividing a predetermined voltage across the first pair of the strain gauges;
dividing the predetermined voltage across the second pair of the strain gauges; and comparing the divided voltages with the pointing device in the unknown position to the divided voltages with the pointing device in the known position.

8. The method of claim 7 wherein:

each of the steps of dividing the predetermined voltage across the first pair of the strain gauges comprises the steps of applying the predetermined voltage across the first pair of strain gauges, and measuring the voltage at the central contact point; and each of the steps of dividing the predetermined voltage across the second pair of the strain gauges comprise the steps of applying the predetermined voltage across the second pair of strain gauges and measuring the voltage at the central contact point.

9. A position sensing device, comprising:

a substrate having an upper surface and a lower surface;

a plurality of perimeter contact points on one of the surfaces of the substrate;

a central contact point on one of the surfaces of the substrate;

a movable element fixed to the upper surface of the substrate so as to transmit stress and strain to the substrate in response to changes in the position of the movable element; and a plurality of strain gauges on the lower surface of the substrate, each electrically connected between one of the perimeter contact points and the central contact point, whereby the strain gauges form at least two strain gauge voltage dividers, each of the strain gauge voltage dividers comprising a pair of strain gauges connected in series at the central contact point, and wherein each of the strain gauges has a resistance that is changed in response to the stress or strain transmitted to the substrate by the movable element.

10. The position sensing device of claim 9, wherein the plurality of strain gauges comprises:

a first pair of strain gauges forming a first voltage divider arranged along a first axis; and a second pair of strain gauges forming a second voltage divider arranged along a second axis that is orthogonal to the first axis.

11. The position sensing device of claim 9, wherein the movable element includes a stick attached to the substrate and movable from a neutral position, and wherein the resistance changes in the strain gauges are proportional to the distance the stick is moved from the neutral position.

12. The position sensing device of claim 9, wherein the plurality of strain gauges comprises three strain gauges arranged in a triangular pattern and are separated by 120 degrees.

13. The position sensing device of claim 12, further comprising a fixed resistor electrically connected between the central contact point and one of the perimeter contact points.

14. The position sensing device of claim 9, further comprising a plurality of secondary perimeter contact points, each of which is electrically connected to the central contact point, and wherein each of the strain gauges is connected between one of the perimeter contact points and one of the secondary perimeter contact points.

15. The position sensing device of claim 9, wherein the movable element includes a stick movable along first and second orthogonal axes, thereby to apply stress or strain to the substrate along the first and second orthogonal axes.

16. The position sensing device of claim 15, wherein the stick is configured to apply stress or strain to the substrate along a third axis that is orthogonal to both of the first and second orthogonal axes.

* * * * *